United States Patent
Kim

(10) Patent No.: US 11,012,147 B1
(45) Date of Patent: May 18, 2021

(54) MULTI-MODE COMMUNICATION ADAPTER SYSTEM WITH SMARTPHONE PROTECTOR MECHANISM AND METHOD OF OPERATION THEREOF

(71) Applicant: Mosat Corporation, Fort Lee, NJ (US)

(72) Inventor: Syngbum Kim, Cliffside Park, NJ (US)

(73) Assignee: M2SL Corporation, Fort Lee, NJ (US)

( * ) Notice: Subject to any disclaimer, the term of this patent is extended or adjusted under 35 U.S.C. 154(b) by 0 days.

(21) Appl. No.: 16/745,022

(22) Filed: Jan. 16, 2020

(51) Int. Cl.
*H04B 7/19* (2006.01)
*H04B 7/185* (2006.01)
*H04B 7/204* (2006.01)

(52) U.S. Cl.
CPC ....... *H04B 7/18513* (2013.01); *H04B 7/1853* (2013.01); *H04B 7/18521* (2013.01); *H04B 7/19* (2013.01); *H04B 7/2041* (2013.01)

(58) Field of Classification Search
CPC ............ H04B 7/18513; H04B 7/18521; H04B 7/1853; H04B 7/19; H04B 7/2014
USPC ................................ 455/12.1; 343/771, 774
See application file for complete search history.

(56) References Cited

U.S. PATENT DOCUMENTS

| | | | | | |
|---|---|---|---|---|---|
| 5,218,467 | A * | 6/1993 | Ross | ................... | H04B 7/18521 398/123 |
| 5,535,432 | A * | 7/1996 | Dent | ..................... | H03L 7/1974 455/12.1 |
| 5,586,165 | A * | 12/1996 | Wiedeman | ......... | H04B 7/18556 455/427 |
| 5,708,716 | A * | 1/1998 | Tisdale | .............. | H04B 7/18565 340/5.61 |
| 5,732,359 | A * | 3/1998 | Baranowsky, II | ........................... | H04B 7/18541 455/437 |
| 5,841,765 | A * | 11/1998 | Fielding | ............. | H04B 7/18582 370/319 |
| 6,035,039 | A * | 3/2000 | Tisdale | .............. | H04B 7/18565 340/5.74 |
| 6,061,579 | A * | 5/2000 | Arai | ....................... | H01Q 1/084 455/347 |
| 6,112,085 | A * | 8/2000 | Garner | ................ | H04W 12/062 455/428 |
| 6,122,671 | A * | 9/2000 | Farrar, Jr. | .......... | H04B 7/18567 370/913 |
| 6,157,621 | A * | 12/2000 | Brown | ................... | H01Q 1/242 370/310 |
| 6,271,788 | B1 * | 8/2001 | Longaker | ................ | G01S 19/07 342/357.31 |

(Continued)

*Primary Examiner* — Hai V Nguyen
(74) *Attorney, Agent, or Firm* — Perspectives Law Group, Corp.

(57) ABSTRACT

A multi-mode communication adapter system comprising: a mobile Earth station including: a flat panel antenna configured to receive a down-link satellite packet, a satellite Rx/Tx, coupled to the flat panel antenna, configured to decode the down-link satellite packet, a storage device, coupled to the satellite Rx/Tx, configured to store satellite data from the down-link satellite packet, an interface module, coupled to the storage device, configured to encode and transfer the satellite data as a cellular communication packet, a WiFi packet, or a combination thereof without accessing a local infrastructure; and a protective cover encloses the mobile Earth station in a protective flap, the protective cover including a cellphone holder configured to secure a smartphone and a hinge between the protective flap and the cellphone holder.

20 Claims, 5 Drawing Sheets

(56) References Cited

U.S. PATENT DOCUMENTS

| | | | | |
|---|---|---|---|---|
| 6,278,696 B1* | 8/2001 | Feldman | H04B 7/18532 | 370/278 |
| 6,339,707 B1* | 1/2002 | Wainfan | H04B 7/195 | 455/427 |
| 6,381,227 B1* | 4/2002 | Fielding | H04B 7/18582 | 370/321 |
| 6,393,000 B1* | 5/2002 | Feldman | H04B 7/18532 | 370/316 |
| 6,400,946 B1* | 6/2002 | Vazvan | H04M 15/8044 | 455/432.1 |
| 6,400,962 B1* | 6/2002 | Yamada | H04B 7/18563 | 455/428 |
| 6,625,130 B2* | 9/2003 | Fielding | H04B 7/18582 | 370/321 |
| 6,643,331 B1* | 11/2003 | Farrell | H03M 13/2903 | 375/261 |
| 6,665,361 B1* | 12/2003 | Christodoulides | H04B 7/18513 | 375/261 |
| 6,771,617 B1* | 8/2004 | Fielding | H04B 7/1858 | 370/321 |
| 6,850,497 B1* | 2/2005 | Sigler | H04B 7/1853 | 370/310 |
| 7,043,196 B1* | 5/2006 | Kawai | H04B 7/18523 | 455/12.1 |
| 7,058,403 B2* | 6/2006 | Zhao | H04B 7/18539 | 370/316 |
| 7,068,971 B2* | 6/2006 | Abutaleb | H04B 7/18532 | 455/12.1 |
| 7,133,418 B1* | 11/2006 | Macridis | H04B 7/18539 | 370/468 |
| 7,142,809 B1* | 11/2006 | Godwin | H04B 7/18513 | 455/3.02 |
| 7,266,097 B2* | 9/2007 | Christodoulides | H04B 7/18513 | 370/321 |
| 7,296,216 B2* | 11/2007 | Shen | H03M 13/1108 | 714/782 |
| 7,321,572 B2* | 1/2008 | Fielding | H04B 7/1858 | 370/321 |
| 7,415,079 B2* | 8/2008 | Cameron | H03M 13/1102 | 375/340 |
| 7,469,141 B2* | 12/2008 | Macridis | H04B 7/18539 | 455/427 |
| 7,818,009 B2* | 10/2010 | Trachtman | H04W 16/00 | 455/450 |
| 8,185,045 B2* | 5/2012 | Mansour | H04B 7/18528 | 455/12.1 |
| 8,548,107 B1* | 10/2013 | Candell | H04B 7/216 | 375/346 |
| 9,154,217 B1* | 10/2015 | Jain | H04B 7/18528 | |
| 9,189,024 B2* | 11/2015 | Knutson | G06F 1/1632 | |
| 9,555,905 B2* | 1/2017 | Griffith, Sr. | B64G 1/646 | |
| 9,647,748 B1* | 5/2017 | Mitchell | H04B 7/1858 | |
| 9,756,549 B2* | 9/2017 | Perdomo | H04L 67/18 | |
| 9,774,395 B1* | 9/2017 | Goorjian | G02B 13/22 | |
| 9,900,082 B1* | 2/2018 | Chowdhury | H04L 43/0876 | |
| 10,015,720 B2* | 7/2018 | Perdomo | H04L 67/18 | |
| 10,110,463 B2* | 10/2018 | Reis | H04M 1/72418 | |
| 10,225,000 B1* | 3/2019 | Chowdhury | H04W 24/02 | |
| 10,306,449 B2* | 5/2019 | Gideon, III | H04M 1/72469 | |
| 10,333,227 B2* | 6/2019 | Kirino | H01Q 13/24 | |
| 10,348,396 B2* | 7/2019 | Olson | B64G 1/10 | |
| 10,374,324 B2* | 8/2019 | Stevenson | H01Q 21/0087 | |
| 10,411,344 B2* | 9/2019 | Pham | H04B 7/18517 | |
| 10,419,106 B1* | 9/2019 | Liu | H04B 7/18515 | |
| 10,506,413 B2* | 12/2019 | Gideon, III | G06F 3/04842 | |
| 10,506,618 B2* | 12/2019 | Murphy | H04W 48/18 | |
| 10,534,894 B2* | 1/2020 | Stein | H01Q 9/28 | |
| 10,566,683 B1* | 2/2020 | Campbell | H01Q 1/288 | |
| 10,622,698 B2* | 4/2020 | Richards | H01Q 1/1257 | |
| 10,673,147 B2* | 6/2020 | Sikes | H01Q 1/1285 | |
| 10,700,429 B2* | 6/2020 | Mehdipour | H01Q 21/0031 | |
| 10,727,949 B2* | 7/2020 | Kay | H04B 7/18513 | |
| 2001/0012758 A1* | 8/2001 | Bradley | H04B 7/18532 | 455/12.1 |
| 2002/0013149 A1* | 1/2002 | Threadgill | H04B 7/18506 | 455/427 |
| 2002/0165001 A1* | 11/2002 | Phillips | H01Q 3/2682 | 455/500 |
| 2003/0012152 A1* | 1/2003 | Feldman | H04L 1/0083 | 370/316 |
| 2003/0045289 A1* | 3/2003 | Zhao | H04B 7/18539 | 455/435.1 |
| 2003/0143949 A1* | 7/2003 | Karabinis | H04B 7/18563 | 455/12.1 |
| 2004/0018837 A1* | 1/2004 | Mayfield | H04B 7/18563 | 455/422.1 |
| 2004/0114547 A1* | 6/2004 | Christodoulides | H04B 7/18532 | 370/316 |
| 2004/0163024 A1* | 8/2004 | Kawai | H04B 7/18523 | 714/748 |
| 2004/0240406 A1* | 12/2004 | Fielding | H04B 7/1858 | 370/316 |
| 2006/0148483 A1* | 7/2006 | Howard | H04L 63/08 | 455/450 |
| 2006/0221884 A1* | 10/2006 | Fielding | H04B 7/1858 | 370/316 |
| 2007/0035440 A1* | 2/2007 | Nichols | G01S 19/48 | 342/357.28 |
| 2007/0049192 A1* | 3/2007 | Hoffmann | H04H 20/63 | 455/3.02 |
| 2008/0144020 A1* | 6/2008 | Nichols | G01S 19/10 | 356/139.01 |
| 2008/0192242 A1* | 8/2008 | Nichols | G01S 19/10 | 356/139.01 |
| 2009/0052373 A1* | 2/2009 | Mansour | H04B 7/18528 | 370/319 |
| 2009/0180451 A1* | 7/2009 | Alpert | H04W 72/1215 | 370/338 |
| 2009/0316618 A1* | 12/2009 | Fielding | H04B 7/1858 | 370/316 |
| 2010/0234071 A1* | 9/2010 | Shabtay | H04B 7/155 | 455/562.1 |
| 2011/0076956 A1* | 3/2011 | Tronc | H04B 7/18515 | 455/66.1 |
| 2012/0289243 A1* | 11/2012 | Tarlow | G01S 5/0072 | 455/456.1 |
| 2013/0058022 A1* | 3/2013 | Knutson | G06F 1/1632 | 361/679.01 |
| 2013/0201316 A1* | 8/2013 | Binder | H04L 67/12 | 348/77 |
| 2014/0071886 A1* | 3/2014 | Monte | H04B 7/18536 | 370/316 |
| 2014/0189755 A1* | 7/2014 | Pal | H04N 21/2665 | 725/68 |
| 2015/0264626 A1* | 9/2015 | Perdomo | H04L 5/00 | 370/216 |
| 2015/0264627 A1* | 9/2015 | Perdomo | H04L 67/18 | 370/329 |
| 2015/0349417 A1* | 12/2015 | Richards | H01Q 1/1257 | 342/352 |
| 2015/0381265 A1* | 12/2015 | Runyon | H01Q 1/288 | 455/13.3 |
| 2016/0023783 A1* | 1/2016 | Griffith, Sr. | G05D 1/00 | 244/2 |
| 2016/0072327 A1* | 3/2016 | Knutson | G06F 1/1632 | 320/108 |
| 2017/0006620 A1* | 1/2017 | Reis | H04B 7/18517 | |
| 2017/0300654 A1* | 10/2017 | Stein | H04B 7/18528 | |
| 2017/0302004 A1* | 10/2017 | Stevenson | H01Q 21/065 | |
| 2018/0014241 A1* | 1/2018 | Perdomo | H04L 67/04 | |
| 2018/0076521 A1* | 3/2018 | Mehdipour | H01Q 5/335 | |
| 2018/0115068 A1* | 4/2018 | Sazegar | H01Q 9/28 | |
| 2018/0123260 A1* | 5/2018 | Sikes | H01Q 21/0012 | |
| 2018/0152235 A1* | 5/2018 | Smoot | H04B 7/18515 | |
| 2018/0233821 A1* | 8/2018 | Pham | H01Q 21/065 | |
| 2018/0254554 A1* | 9/2018 | Sorrentino | H01Q 1/1257 | |

(56) References Cited

U.S. PATENT DOCUMENTS

| | | | | |
|---|---|---|---|---|
| 2018/0323863 A1* | 11/2018 | Bournes | ............. | H04B 7/18521 |
| 2018/0343055 A1* | 11/2018 | Olson | ....................... | B64G 1/10 |
| 2019/0097299 A1* | 3/2019 | Fotheringham | .......... | H01Q 1/02 |
| 2019/0215058 A1* | 7/2019 | Smyth | ................... | H04W 16/14 |
| 2019/0237873 A1* | 8/2019 | Sazegar | ................. | H01Q 21/28 |
| 2019/0280387 A1* | 9/2019 | Posthuma | ............ | H01Q 21/065 |
| 2019/0280763 A1* | 9/2019 | Smyth | ................ | H04B 7/18517 |
| 2019/0350050 A1* | 11/2019 | Piironen | ............... | H04W 88/16 |
| 2019/0379446 A1* | 12/2019 | Rothaar | ............. | H04B 7/18541 |
| 2020/0008122 A1* | 1/2020 | Radko | ................... | H04W 76/34 |
| 2020/0044326 A1* | 2/2020 | Olfert | .................. | H01Q 21/061 |
| 2020/0112095 A1* | 4/2020 | Pham | ................ | H04B 7/18517 |
| 2020/0119811 A1* | 4/2020 | Kay | ..................... | H04B 7/1858 |
| 2020/0152324 A1* | 5/2020 | Stein | ....................... | H04L 69/40 |
| 2020/0212992 A1* | 7/2020 | Preston | ................ | H04B 7/0608 |
| 2020/0221186 A1* | 7/2020 | Shambro, Jr. | ...... | H04N 21/4332 |
| 2020/0233821 A1* | 7/2020 | Kumar | ................... | G06F 13/20 |
| 2020/0235967 A1* | 7/2020 | Bowen | ................... | H04L 27/02 |
| 2020/0252881 A1* | 8/2020 | Noel | ................... | H04W 52/242 |
| 2020/0259560 A1* | 8/2020 | Tong | ................. | H04B 7/18521 |
| 2021/0013622 A1* | 1/2021 | Sikes | ................... | H01Q 1/1285 |

* cited by examiner

MULTI-MODE COMMUNICATION ADAPTER SYSTEM WITH SMARTPHONE PROTECTOR MECHANISM AND METHOD OF OPERATION THEREOF

TECHNICAL FIELD

An embodiment of the present invention relates generally to a multi-mode communication system, and more particularly to a communication system for reduced power operations while under emergency conditions.

BACKGROUND

Modern smartphones are everywhere. They are constantly used on a daily basis. Quite frequently these smartphones get dropped, sat upon, or left exposed to outdoor elements. Most smart phone users install a protective structure that can reduce the shock applied to the smart phone during a drop. They can also provide some resistance to bending when sat upon. Unfortunately, these protective structures have a fairly low resistance to damage the smartphone can experience in a single drop. Aside from minimal protection for the phone case, these protective structures do not provide any additional features that can protect or enhance the smart phone.

Thus, a need still remains for a multi-mode communication adapter system with smartphone protector mechanism to provide improved performance, data reliability and recovery. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an apparatus, including a multi-mode communication adapter system, including: a mobile Earth station including: a flat panel antenna configured to receive a down-link satellite packet, a satellite Rx/Tx, coupled to the flat panel antenna, configured to decode the down-link satellite packet, a storage device, coupled to the satellite Rx/Tx, configured to store satellite data from the down-link satellite packet, an interface module, coupled to the storage device, configured to encode and transfer the satellite data as cellular communication packets, the WiFi hotspot, or a combination thereof without accessing a local infrastructure; and a protective cover encloses the mobile Earth station in a protective flap, the protective cover including a cellphone holder configured to secure a smartphone and a hinge between the protective flap and the cellphone holder.

An embodiment of the present invention provides a method including: receiving a down-link satellite packet; decoding the down-link satellite packet; storing satellite data from the down-link satellite packet; encoding and transferring the satellite data as a cellular communication packet, a WiFi packet, or a combination thereof without accessing a local infrastructure; exchanging the cellular communication packets between a smartphone, and a mobile Earth station; and securing the smartphone within a cellphone holder, in a protective cover including enclosing the mobile Earth station in a protective flap.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
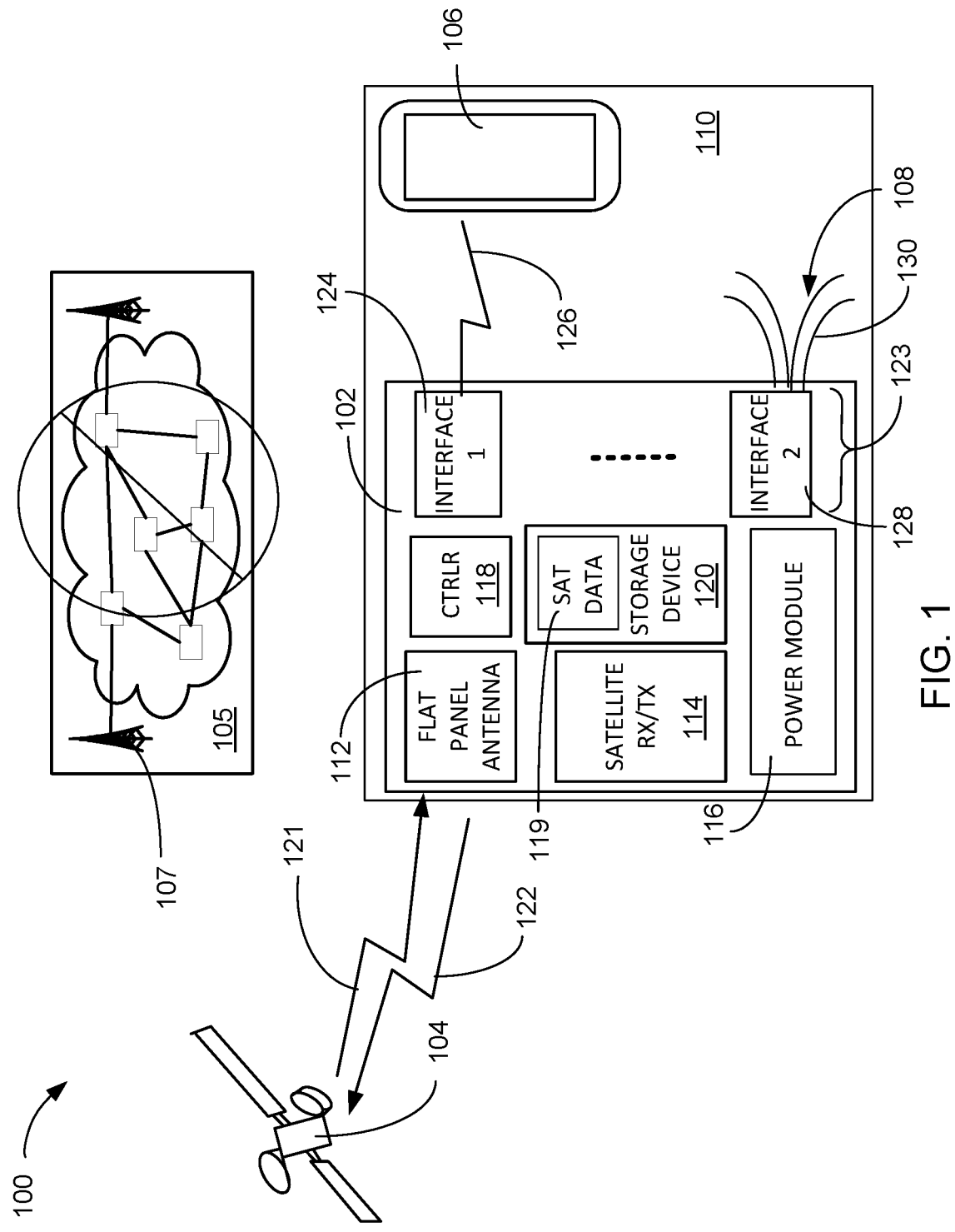
FIG. 1 is an example of a functional block diagram of a multi-mode communication adapter system with smartphone protection mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

As an example, objects in low-Earth orbit are at an altitude of between 160 to 2,000 km (99 to 1200 mi) above the Earth's surface. Any object below this altitude will suffer from orbital decay and will rapidly descend into the atmosphere, either burning up or crashing on the surface. Objects at this altitude also have an orbital period (i.e. the time it will take them to orbit the Earth once) of between 88 and 127 minutes. A geosynchronous orbit is a high Earth orbit that allows satellites to match Earth's rotation. Located at 22,236 miles (35,786 kilometers) above Earth's equator, this position is a valuable spot for monitoring weather, communications and surveillance.

As an example, three parameters can be manipulated in order to optimize the capacity of a communications link—bandwidth, signal power and channel noise. An increase in the transmit power level results in an increase of the communication link throughput, likewise a decrease in power will result in the opposite effect reducing the throughput. Also, for example, another way to improve the link throughput would be to increase the size of the receiving antenna in order to have a higher level of energy received at a receiver. But this is where operational constraints become apparent, as, an increase in the size of the receiving antenna could lead to an unfeasible installation for a personal or business application.

The term "module" referred to herein can include specialized hardware supported by software in an embodiment of the present invention in accordance with the context in which the term is used. For example, the software can be machine code, firmware, embedded code, and application software. Also, for example, the specialized hardware can be circuitry, processor, computer, integrated circuit, integrated circuit cores, a pressure sensor, an inertial sensor, a microelectromechanical system (MEMS), passive devices, or a combination thereof. The term "abut" referred to herein is defined as two components in direct contact with each other with no intervening elements. The term "couple" referred to herein is defined as multiple objects linked together by wired or wireless means. The term "local infrastructure" referred to herein is defined as cell towers, networking apparatus, repeaters, or a combination thereof used for cellular communication.

Referring now to FIG. 1, therein is shown an example of a functional block diagram of a multi-mode communication adapter system 100 with smartphone protection mechanism in an embodiment of the present invention. The multi-mode communication adapter system 100 is depicted in FIG. 1 as a functional block diagram of the multi-mode communication adapter system 100 with a mobile Earth station 102.

The mobile Earth station 102 can be an integrated hardware structure that can couple to a satellite 104 in order to provide communication in a region whether a local infrastructure 105 is available or disabled due to damage or loss of power. The mobile Earth station 102 can be customized to provide support for the satellite 104 in low-Earth orbit (LEO), at an altitude of between 160 to 2,000 km (99 to 1200 mi) above the Earth's surface, or geosynchronous Earth orbit (GEO), which is a high Earth orbit located at 22,236 miles (35,786 kilometers) above Earth's equator, that allows satellites to match Earth's rotation. The satellite 104 can transmit and receive a Ka band signal in the range of 17.8 to 18.6 GHz or 27.5 to 28.35 GHz. It is understood that the mobile Earth station 102 can be configured to support other orbit altitudes and frequency spectrums without limiting the invention.

The mobile Earth station 102 can provide a communication link between the satellite 104 and smartphone 106 including as examples cell phones supporting third generation telecommunication (3G), long term evolution (LTE), fourth generation telecommunication (4G), fifth generation telecommunication (5G), or a combination thereof. The mobile Earth station 102 can also provide a communication link between the satellite 104 and act as a wireless fidelity application (WiFi) hotspot 108. The WiFi hotspot 108 can include support for computers, laptops, tablets that access a local area network (LAN), a wide area network (WAN), a Fiber-Channel token ring (FC), or a combination thereof.

The mobile Earth station 102 can also provide a communication link between one or more of the satellite 104 and the smartphone 106.

The multi-mode communication adapter system 100 can include a protective cover 110 that can be formed to enclose the mobile Earth station 102 and to surround the smartphone 106. The protective cover 110 can be formed of a plastic material including Acrylonitrile Butadiene Styrene (ABS), polypropylene (PP), polyether-ether-ketone (PEEK), or the like. The protective cover 110 can provide electrical interconnections (not shown) between the mobile Earth station 102 and the smartphone 106 in order to provide a common electrical connection to a power module 116.

By way of an example, in a disaster situation, the mobile Earth station 102 can provide basic and advanced communication services for anyone attempting to communicate without the use of the local infrastructure 105. The mobile Earth station 102 can be configured to support other interface structures (not shown), including Bluetooth, Near Field communication, laser communication, or the like.

The mobile Earth station 102 can include a flat panel antenna 112 coupled to a satellite receiver/transmitter (Rx/Tx) 114 configured to communicate with the satellite 104 orbiting the Earth in the LEO or the GEO position. The flat panel antenna 112 can be configured to support frequencies in a Ku frequency band, in the range of 13.4 GHz through 14.9 GHz, in a Ka frequency band, in the range of 27.5 GHz through 32.5 GHz, in a 5G frequency band, targeted for 15 GHz or 28 GHz, or a combination thereof. It is understood that other frequency ranges can be supported in both higher frequency and lower frequencies. The flat panel antenna 112 can be a feed horn array coupled to a waveguide interposer and a waveguide interface for communicating with the satellite Rx/Tx 114.

The power module 116 can provide independent power required to operate the mobile Earth station 102 and provide auxiliary power for the smartphone 106. The power module 116 can include batteries, solar power, a generator interface, wind mill power, or a combination thereof. The power module 116 can include any sustainable power source that will provide sufficient energy to enable the communication through the mobile Earth station 102.

The mobile Earth station 102 can also include a station controller 118, such as a processor, a micro-computer, a micro-processor core, an application specific integrated circuit (ASIC) an embedded processor, a microprocessor, a hardware control logic, a hardware finite state machine (FSM), a digital signal processor (DSP), or a combination thereof. The station controller 118 can manage the operations of the mobile Earth station 102 including managing a satellite data 119. The satellite data 119 can be the payload from down-link satellite packets 121 or the preparation data for encoding up-link satellite packets 122. The station controller 118 can access a storage device 120 that can provide a data storage function for receiving and reformatting the down-link satellite packets 121 of the satellite data 119 for transfer to the smartphone 106. The station controller 118 can access the storage device 120 that can provide a data storage function for assembling the satellite data 119 requests from the smartphone 106 that can be submitted to the Satellite Rx/Tx 114 to generate the up-link satellite packets 122.

The storage device 120 can include a hard disk drive (HDD), a solid-state storage device (SSD), non-volatile memory, volatile memory, or a combination thereof. The physical capacity of the storage device 120 can be configured based on the number and type of interface modules 123 that are to be activated by the mobile Earth station 102.

By way of an example, the mobile Earth station 102 can be configured with a first interface module 124 that can provide cellular communication packets 126 to the smartphone 106, a second interface module 128 that can provide the WiFi hotspot 108 for the smartphone 106 or act as the WiFi hotspot 108. It is understood that other types of the interface modules 123 can be installed in the mobile Earth station 102 in order to address the communication needs of a region (not shown) that has the local infrastructure 105 disabled due to damage or loss of power.

It is understood that the mobile Earth station 102 can provide needed satellite communication options, when the local infrastructure 105 cannot support the communication requirement for the region. This could be caused by natural disaster, man-made or naturally occurring power loss, damage to cell towers 107, or communication traffic overload due to some calamity. The mobile Earth station 102 can provide a configurable communication interface for mobile applications, including police and fire department vehicles, private vehicles, military, commercial, and private water vessels, military, commercial, or private aircraft.

The mobile Earth station 102 can provide multiple communication types in an off-the-grid environment. Many remote locations rely on the satellite 104 for basic communication and Internet services. The mobile Earth station 102 can be integrated in the protective cover 110 of the multi-mode communication adapter system 100 for use in multiple environments including an automobile, a train, a motorcycle, an airplane, a boat, a bicycle, or the like. The multi-mode communication adapter system 100 of the present invention can quickly provide a communication infrastructure in regions where the local infrastructure 105 is disabled due to lack of power or natural disasters have disabled any of the local infrastructure 105 that may have been present.

It has been discovered that the multi-mode communication adapter system 100 can quickly convert the satellite data 119 to provide the cellular communication packets 126 and WiFi packets 130 for the smartphone 106, the WiFi hotspot 108, or a combination thereof whether or not the local infrastructure 105 is disabled or missing completely. Since the mobile Earth station 102 can be configured for communicating with specific ones of the satellite 104 and provide multiple of the interface modules 123 to address communication issues that previously required a base station the size of a house that cannot be transported or quickly configured to address outages that can befall a region. It is understood that the frequencies of the cellular communication packets 126, the WiFi packets 130, the down-link satellite packets 121, and the up-link satellite packets 122 can pass through the protective cover 110 without impediment.

Figure 2:
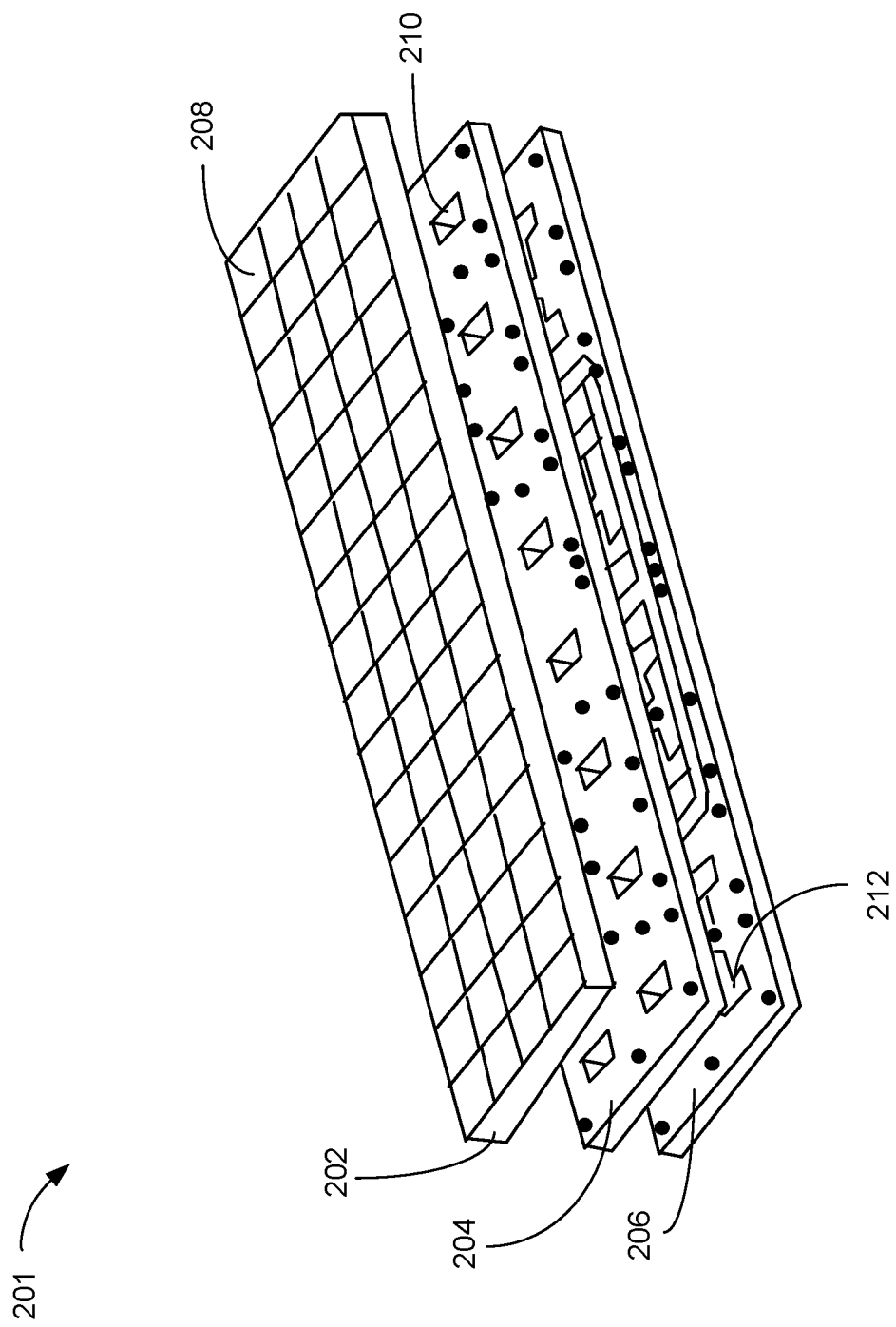
FIG. 2 is an exploded view of an example of a flat panel antenna in an embodiment.

Referring now to FIG. 2, therein is shown an exploded view of a flat panel antenna 201 in an embodiment. The flat panel antenna 201 can include a feed horn array 202, a waveguide interposer 204 and a waveguide interface board 206 that can direct the frequencies of the down-link satellite packets 121 of FIG. 1 to the satellite Rx/Tx 114 of FIG. 1. By way of an example, the feed horn array 202 is shown having a four by 16 configuration. Each feed horn 208 can be configured to operate with three of the adjacent ones of the feed horn 208 to steer the down-link satellite packets 121 into the waveguide interposer 204. The feed horn array 202 can have dimensions of 12.5 cm×2.15 cm (4.92"×0.85"). The embodiment of the flat panel antenna 201 is suitable for communication with the satellite 104 of FIG. 1 in a low-Earth orbit (LEO) and using a Ka frequency spectrum in the range of 17.8 to 18.6 GHz or 27.5 to 28.35 GHz.

The waveguide interposer 204 can abut the feed horn array 202. A tight seal between the waveguide interposer 204 and the feed horn array 202 can provide a low impedance path for the down-link satellite packets 121 at a received frequency in the Ka band specified as a frequency range of 27.5 GHz to 32.5 GHz as a down-link. In a further embodiment the flat panel antenna 201 can also transmit the up-link satellite packets 122 and receive the down-link satellite packets 121 at a frequency range of 11.075 GHz to 14.375 GHz to and from the satellite 104 that is in a geosynchronous Earth orbit (GEO). In this example, the flat panel antenna 201 used to support the satellite 104 operating in GEO has a dimension of 30 cm×30 cm (11.81" by 11.81") and is configured as a 32 by 32 array of the feed horn 208.

The waveguide interposer 204 can have a waveguide opening 210 that is specific to the frequency used to communicate with the satellite 104. The waveguide opening 210 for the satellite 104 configured in LEO can have a dimension of 19.05 mm by 9.525 mm of the rectangular shape of the waveguide openings 210. The waveguide opening is oriented so that four of the feed horn 208 are aligned with the input of the waveguide opening 210. This also allows the flat panel antenna 201 to use electronic tracking of the satellite 104.

The waveguide interface board 206 can abut the waveguide interposer 204, opposite the feed horn array 202. The waveguide interface board 206 can have a rectangular waveguide 212 formed on the surface that abuts the waveguide interposer 204. the openings of the rectangular waveguide 212 are aligned with the waveguide openings 210 of the waveguide interposer 204, forming an impedance matched structure that can pass the down-link satellite packets 121 with a gain of 20.0 to 23.8 dBi for the LEO configuration and a gain of 36.3 to 36.8 dBi for the larger of the flat panel antenna 201 in the GEO configuration.

It has been discovered that multi-layer structure of the flat panel antenna 201 can improve gain the antenna structure is assembled by joining the feed horn array 202, the waveguide interposer 204, and the waveguide interface board 206. By matching the impedance of the combined structure, the flat panel antenna 201 can boost the overall gain of the flat panel antenna 201 by 1 to 3 dB. In addition, the voltage standing wave ratio (VSWR) of the antenna is less than 2:1, and the return loss is also lower than −10 dB. Because the structure requires the up-link satellite packet 122 and the down-link satellite packets 121 to make a 90-degree turn between the waveguide interposer 204 and the waveguide interface board 206, a bulge structure was added to the waveguide interface board 206 to reduce the reactance of the circuit and optimized the transmission of the up-link satellite packet 122 and the down-link satellite packets 121.

Figure 3:
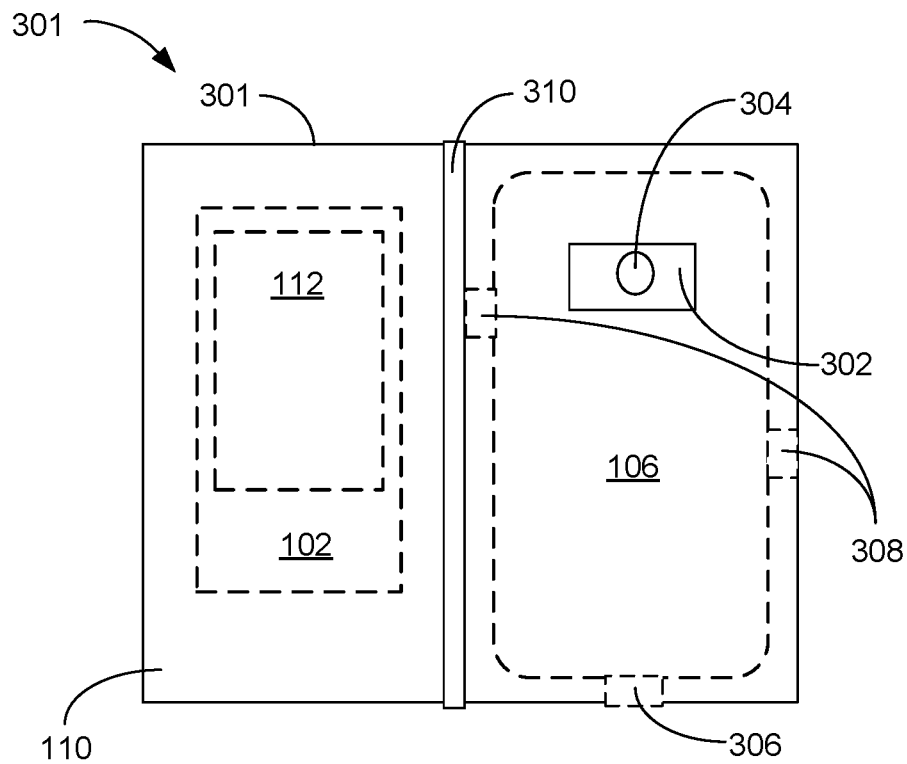
FIG. 3 is an example of an assembly drawing of a backside view of the smartphone protection system in an embodiment of the present invention.

Referring now to FIG. 3, therein is shown an example of an assembly drawing of a smartphone protection mechanism 301 in an embodiment of the present invention. The assembly drawing of a backside view of the smartphone protection mechanism 301 depicts the mobile Earth station 102 including the flat panel antenna 112 can be formed in the protective cover 110. A camera portal 302 can be positioned in the protective cover 110 that allows a camera lens 304, of the smartphone 106, to be positioned within the camera portal 302. It is understood that the position of the camera portal 302 is an example only and other positions of the camera portal 302 are possible.

A power port 306 can be an opening in the protective cover 110 used to access the charging system for the mobile Earth station 102 and the smartphone 106. It is understood that the interconnect between the power module 116 of FIG. 1 and the smartphone 106 can be coupled together through the power port 306 and internal wiring (not shown) of the protective cover 110. The configuration shown in FIG. 3 can allow sharing of the power module 116 and the battery (not shown) of the smartphone 106 for increasing the useable duration of the multi-mode communication adapter system 100. Access ports 308 can provide an opening in the protective cover 110 that allows operation of function keys (not shown) in the smartphone 106.

Figure 4:
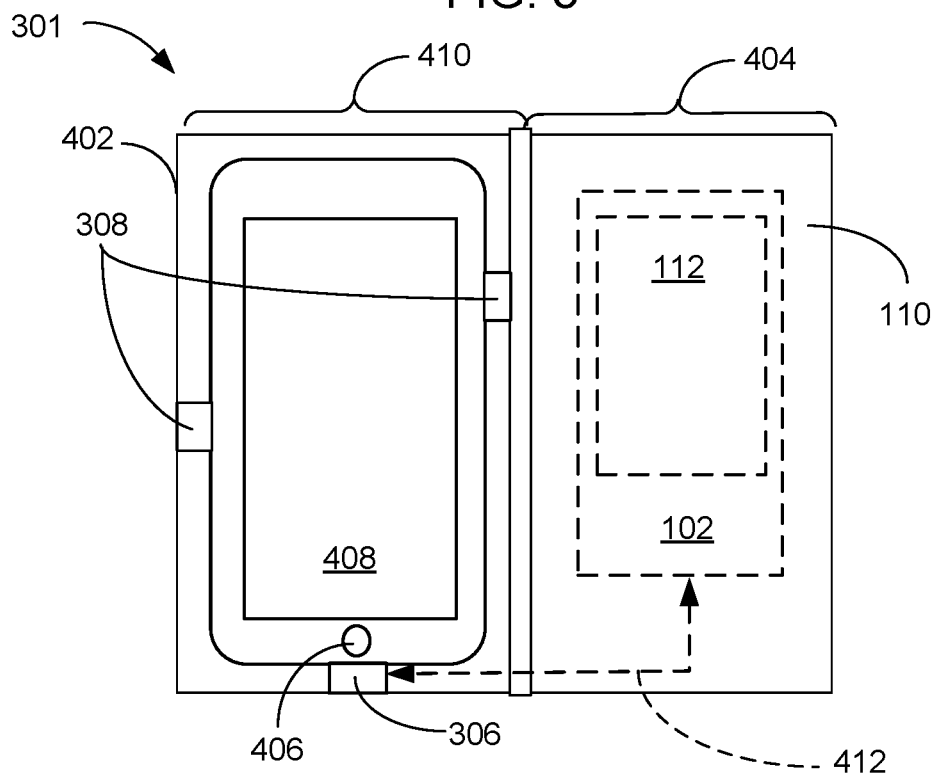
FIG. 4 is an example of an assembly drawing of a frontside view of the smartphone protection system in an embodiment of the present invention.

Referring now to FIG. 4, therein is shown an example of an assembly drawing of the smartphone protection mechanism 301 in an embodiment of the present invention. As shown in FIG. 4 a front side 402 of the multi-mode communication adapter system 100 can include a folding hinge 310, which can be formed in the protective cover 110, that allows a protective flap 404 containing the mobile Earth station 102 to fold over and protect the smartphone 106 by covering the access ports 308, a power button 406, and a display screen 408. A cellphone holder 410 can be formed in the protective cover 110 in order to mount the smartphone 106 in a cellphone holder 318. The cellphone holder 410 can be an enclosure that is part of the protective cover 110, can secure the smartphone 106. A power bus 412 can be coupled between the power module 11 of the mobile Earth station 102 and the smartphone 106 in order to boost the operating time of the smartphone 106.

It is understood that the protective flap 404 of the protective cover 110 containing the mobile Earth station 102 is completely enclosed by the protective cover 110 and when folded can provide the protective flap 404 over the cellphone holder 410 and the smartphone 106. While the smartphone protection mechanism 301 is shown in a book binding style, other embodiments are possible. The smartphone protection mechanism 301 can be implemented as a "box" enclosing the smartphone 106, that can extend out of the box for use.

It has been discovered that the smartphone protection mechanism 301 can provide communication through the satellite 104 of FIG. 1 without accessing the local infrastructure 105, whether the local infrastructure 105 is available or not available. By forming the protective cover 110 to enclose the mobile Earth station 102, within the protective flap 404 of the protective cover 110 containing the mobile Earth station 102 to fold over and protect the smartphone 106. The rigidity of the protective flap 404 of the protective cover 110 containing the mobile Earth station 102 can cover and protect the smartphone 106. The smartphone protection mechanism 301 can also provide the cellular communication packets 126 of FIG. 1, the WiFi hotspot 108 of FIG. 1, or a combination thereof, while communicating with the satellite 104. The power bus 412 can provide energy from the power module 116 to the smartphone 106 in order to extend the useful operating period of the smartphone 106.

Figure 5:
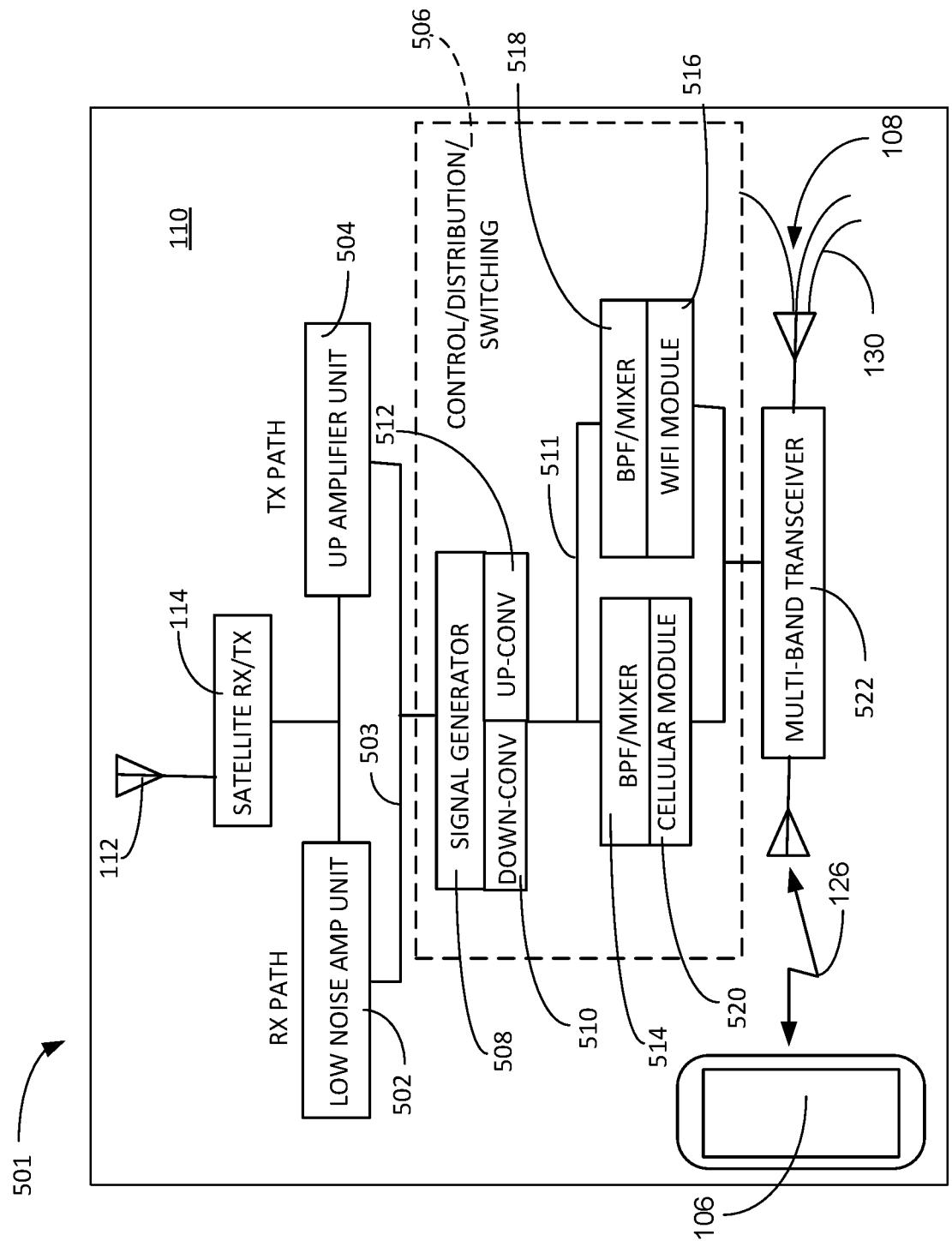
FIG. 5 is an architectural block diagram of the mobile Earth station in an alternative embodiment of the present invention.

Referring now to FIG. 5, therein is shown an architectural block diagram 501 of the mobile Earth station 102 in an alternative embodiment of the present invention. The architectural block diagram 501 of the mobile Earth station 102 depicts the flat panel antenna 112 coupled to the satellite Rx/Tx 114. A low-noise Amplifier unit 502 can be in the receiver path in order to boost the received signal level. An up-amplifier unit 504 can boost the signal voltage in the transmission path to the satellite Rx/Tx 114. The low-noise amplifier unit 502 can be an analog circuit configured to raise the signal level without introducing electrical noise into a satellite frequency 503. The up-amplifier unit 504 can be an analog circuit configured to raise the voltage level of an encoded signal, at the satellite frequency 503, in preparation for sending the up-link satellite packet 122 of FIG. 1 to the satellite 104 of FIG. 1.

A control/distribution/switching module 506 can process the down-link satellite packets 121 of FIG. 1 and generate the frequency and data content for the up-link satellite packets 122. The control/distribution/switching module 506 can be an application specific integrated circuit (ASIC) that includes a signal generator 508 for generating and tracking the reference frequency for encoding/decoding the data sent to or received from the satellite 104.

A low-noise block downconverter 510 can serve as the RF front end of the satellite Rx/Tx 114, receiving the microwave signal from the satellite 104, amplifying it, and down-converting the block of frequencies to a lower block of intermediate frequencies (IF). The low-noise block downconverter 510 can be a hardware circuit tuned for reducing the frequencies received from the satellite 104 to a more easily routable internal frequency 511. It is understood that the internal frequency 511 can be a decades lower frequency than the satellite frequency 503.

In the transmission path, a block up-converter 512 can receive encoded messages at the internal frequency 511 and boost the frequency of the encoded messages to the satellite frequency 503. The block up-converter 512 can be a hardware circuit capable of combining the encoded messages at the internal frequency 511 with the reference frequency generated by the signal generator 508 to produce the encoded messages at the satellite frequency 503.

A band pass filter (BPF)/mixer 514 can condition messages that are processed by a WiFi module 516 that can support 802.11 b/g/n for providing Internet access through the WiFi hotspot 108 of FIG. 1. The BPF/mixer 514 and the WiFi module 516 are both hardware modules that work together to transfer the WiFi packets 130 of FIG. 1. An additional band pass filter (BPF)/mixer 518 can condition messages that are processed by a cellular module 520. The additional BPF/mixer 518 and the cellular module 520 are both hardware modules that work together to transfer the cellular communication packets 126 of FIG. 1. The cellular module 520 can support several communication standards including 3G, 4G, long term evolution (LTE), and 5G. It is understood that other communication standards can be implemented.

Both the WiFi module 516 and the cellular module 520 can be coupled to a multi-band transceiver 522 that can boost the power of the WiFi packets 130 and the cellular communication packets 126 for communication with external devices including the smartphone 106 and the WiFi hotspot 108. The multi-band transceiver 522 can be a hardware module capable of transmitting and receiving messages at different frequencies and having different content. The multi-band transceiver 522 can provide sufficient power to broadcast the content from the WiFi module 516 and the cellular module 520. The multi-band transceiver 522 can produce the WiFi packets 130 including wireless Internet signals having a frequency of 2.4 GHz.

It is understood that the mobile Earth station 102 can include the power module 116 of FIG. 1 in order to provide the energy required to power the hardware circuits for communicating between the satellite 104 and the smartphone 106, the WiFi hotspot 108, and extend the battery life of the smartphone 106. It is further understood that additional interface modules can be installed in order to support specific communication structures not listed above.

It has been discovered that the mobile Earth station 102 can provide a number of communication services without the use of the local infrastructure 105 that may be damaged or without the power required to operate normally. The mobile Earth station 102 provides a communication base for exchanging information between the satellite 104, the smartphone 106, the WiFi hotspot 108, or a combination thereof, that can support a few people, such as first responders, aid workers, emergency medical technicians, or a small town with hundreds of people. The mobile Earth station 102 can act as a temporary base for all emergency communication to provide a WiFi zone of at least 1 km. The mobile Earth station 102 can also provide a communication structure for a residence that is off-the-grid and has no wired power available.

Figure 6:
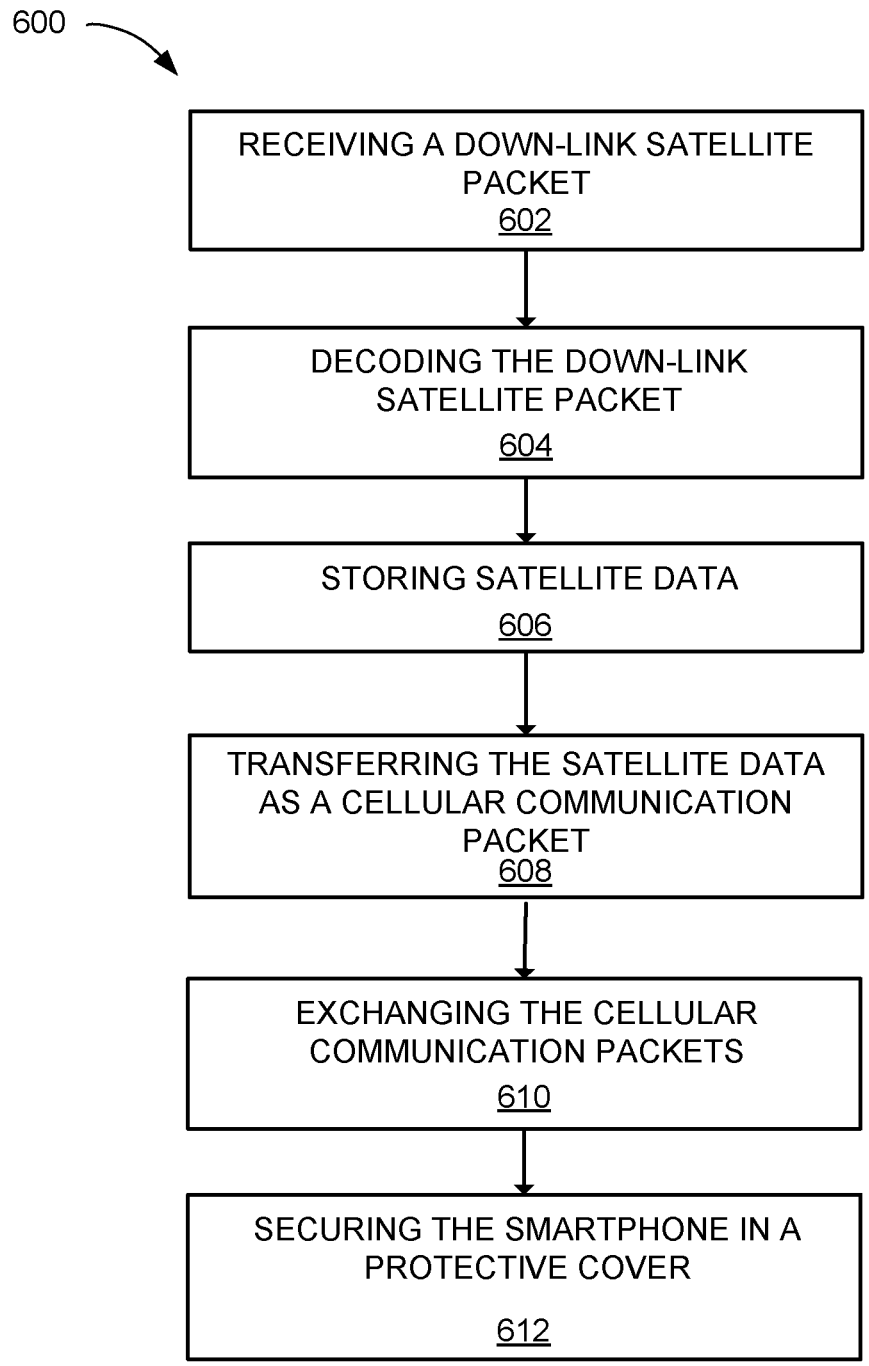
FIG. 6 is a flow chart of a method of operation of a multi-mode communication adapter system in an embodiment of the present invention.

Referring now to FIG. 6, therein is shown a flow chart of a method 600 of operation of the multi-mode communication adapter system 100 in an embodiment of the present invention. The method 600 includes: receiving a down-link satellite packet in a block 602; decoding the down-link satellite packet in a block 604; storing satellite data from the down-link satellite packet in a block 606; encoding and transferring the satellite data as a cellular communication packet, a WiFi packet, or a combination thereof without accessing a local infrastructure in a block 608; exchanging the cellular communication packets between a smartphone, and a mobile Earth station in a block 610; and securing the smartphone within a cellphone holder in a protective cover including enclosing the mobile Earth station in a protective flap in a block 612.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A multi-mode communication adapter system comprising:
   a mobile Earth station including:
   a flat panel antenna configured to receive a down-link satellite packet, wherein the flat panel includes a waveguide interposer,
   a satellite Rx/Tx, coupled to the flat panel antenna, configured to decode the down-link satellite packet,
   a storage device, coupled to the satellite Rx/Tx, configured to store satellite data from the down-link satellite packet,
   an interface module, coupled to the storage device, configured to encode and transfer the satellite data as a cellular communication packet, a WiFi packet, or a combination thereof without accessing a local infrastructure; and
   a protective cover encloses the mobile Earth station in a protective flap, the protective cover including a cellphone holder configured to secure a smartphone and a hinge between the protective flap and the cellphone holder.

2. The system as claimed in claim 1 wherein the mobile Earth station includes a second interface module, coupled to the storage device, configured to support a WiFi hotspot.

3. The system as claimed in claim 1 wherein the mobile Earth station includes a power module, coupled to the smartphone, by a power bus between the power module and the smartphone.

4. The system as claimed in claim 1 wherein the protective cover is configured to pass the down-link satellite packet includes receiving a frequency in the range of 27.5 GHz to 32.5 GHz when a satellite is in Low Earth Orbit (LEO).

5. The system as claimed in claim 1 wherein the protective cover is configured to pass the down-link satellite packet includes receiving a frequency in the range of 10.7 GHz to 14.9 GHz when a satellite in in Geosynchronous Earth Orbit (GEO).

6. The system as claimed in claim 1 wherein the mobile Earth station further comprises the flat panel antenna, configured to couple a satellite, measures 12.5 cm by 2.1 cm configured to receive the down-link satellite packet from the satellite in LEO.

7. The system as claimed in claim 1 wherein t the mobile Earth station further comprises a station controller configured to convert satellite data into the cellular communication packet.

8. The system as claimed in claim 1 wherein the interface module configured to transfer the satellite data as the cellular communication packet includes accepting 3G, 4G, long term evolution (LTE), 5G, or a combination thereof through the cellular communication packet.

9. The system as claimed in claim 1 wherein the mobile Earth station further comprises a station controller configured to convert satellite data into the WiFi packet.

10. The system as claimed in claim 1 wherein the cellphone holder configured to secure the smartphone includes the protective flap of the protective cover containing the mobile Earth station closed on the smartphone.

11. A method of operation of a multi-mode communication adapter system comprising:
   receiving a down-link satellite packet through a waveguide interposer;
   decoding the down-link satellite packet;
   storing satellite data from the down-link satellite packet;
   encoding and transferring the satellite data as a cellular communication packet, a WiFi packet, or a combination thereof without accessing a local infrastructure;
   exchanging the cellular communication packets between a smartphone, and a mobile Earth station; and
   securing the smartphone within a cellphone holder in a protective cover, including enclosing the mobile Earth station in a protective flap.

12. The method as claimed in claim 11 wherein coupling the mobile Earth Station including coupling the storage device to a second interface module, configured to support a WiFi hotspot.

13. The method as claimed in claim 11 further comprising powering the smartphone by a power module within the mobile Earth station coupled to the smartphone.

14. The method as claimed in claim 11 wherein receiving the down-link satellite packet includes passing a frequency in the range of 27.5 GHz to 32.5 GHz through the protective cover when the satellite is in Low Earth Orbit (LEO).

15. The method as claimed in claim 11 wherein receiving the down-link satellite packet includes passing a frequency in the range of 10.7 GHz to 14.9 GHz through the protective cover when the satellite in in Geosynchronous Earth Orbit (GEO).

16. The method as claimed in claim 11 wherein receiving the down-link satellite packet by coupling a flat panel antenna to the satellite including the flat panel antenna measuring 12.5 cm by 2.1 cm for the satellite in LEO.

17. The method as claimed in claim 11 further comprising converting satellite data into the cellular communication packet by a station controller.

18. The method as claimed in claim 11 wherein transferring the satellite data as the cellular communication packet includes accepting 3G, 4G, long term evolution (LTE), 5G, or a combination thereof through the cellular communication packet.

19. The method as claimed in claim 11 further comprising converting satellite data into the WiFi packet.

20. The method as claimed in claim 11 wherein the securing the smartphone includes the cellphone holder configured to secure the smartphone and the protective flap of the protective cover containing the mobile Earth station closed on the smartphone.

* * * * *